United States Patent
Hsieh (10) Patent No.: US 12,526,431 B2
(45) Date of Patent: Jan. 13, 2026

(54) ADAPTIVE FRAME DROPPING CONTROL METHOD AND IMAGE PROCESSING SYSTEM

(71) Applicant: VIVOTEK INC., New Taipei (TW)

(72) Inventor: Kuo-Yeh Hsieh, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 18/940,855

(22) Filed: Nov. 8, 2024

(65) Prior Publication Data

US 2025/0159191 A1      May 15, 2025

(30) Foreign Application Priority Data

Nov. 10, 2023   (TW) .................................. 112143377

(51) Int. Cl.
*H04N 19/146*   (2014.01)
*H04N 19/172*   (2014.01)

(52) U.S. Cl.
CPC ......... *H04N 19/146* (2014.11); *H04N 19/172* (2014.11)

(58) Field of Classification Search
CPC ........................... H04N 19/146; H04N 19/172
USPC ..................................................... 375/240.02
See application file for complete search history.

(56) References Cited

U.S. PATENT DOCUMENTS

2018/0183696 A1*   6/2018   Chang .................... H04L 47/30

FOREIGN PATENT DOCUMENTS

| CN | 103310820 B | 3/2016 |
|----|-------------|--------|
| CN | 104185083 B | 8/2017 |
| TW | I484818 B | 5/2015 |

* cited by examiner

*Primary Examiner* — Amir Shahnami
(74) *Attorney, Agent, or Firm* — Winston Hsu (57) ABSTRACT

An adaptive frame dropping control method is applied to an image processing system. The adaptive frame dropping control method includes utilizing a drop control module of the image processing system to acquire a first image without image processing from a latency buffer, utilizing the first image to compute a first average consuming period of the latency buffer, acquiring a second image without the image processing and later than the first image from the latency buffer for computing a left period of the second image, and determining whether to drop the second image in accordance with a comparison result of the left period and the first average consuming period.

20 Claims, 5 Drawing Sheets

ADAPTIVE FRAME DROPPING CONTROL METHOD AND IMAGE PROCESSING SYSTEM

BACKGROUND OF THE INVENTION

1. Field of the Invention

The present invention relates to an image processing technology, and more particularly, to an adaptive frame dropping control method and a related image processing system.

2. Description of the Prior Art

With the advanced digital image processing technology, image resolution continues to improve, and a demand of the artificial intelligence algorithm is also increased. When the image processing system performs the specific image algorithm on the high-resolution image, such as mosaic, watermark, adjustment of compression parameters, image processing and analysis computation of the image processing system are greatly increased. If the overall computation load of the image processing system exceeds the system load capacity, computation efficiency of the image processing system is decreased and abnormal images are generated accordingly. One conventional abnormal image processing method drops the image at the specific interval, or drop original data or encoding of the related image when variation of two adjacent images is smaller than the preset threshold; another conventional abnormal image processing method drops the related image when system settings are changed. However, the foresaid 1 abnormal image processing methods often drop too many images, and design of an adaptive frame dropping control method and a related image processing system of increasing a number of the effective encoding image is an important issue in the image processing industry.

SUMMARY OF THE INVENTION

The present invention provides an adaptive frame dropping control method and a related image processing system for solving above drawbacks.

According to the claimed invention, an adaptive frame dropping control method is applied to an image processing system. The adaptive frame dropping control method includes utilizing a first image in a latency buffer that is not processed by condition change to compute a first average consuming period of the latency buffer, computing a left period of a second image in the latency buffer that is not processed by the condition change and enters the latency buffer later than the first image, and comparing the left period with the first average consuming period and determining whether to drop the second image in accordance with a comparison result of the left period and the first average consuming period.

According to the claimed invention, an image processing system includes a latency buffer and a drop control module. The latency buffer has a plurality of image accommodation intervals adapted to accommodate several images of an image stream. The drop control module is electrically connected with the latency buffer, and adapted to utilize a first image in the latency buffer that is not processed by condition change to compute a first average consuming period of the latency buffer, to compute a left period of a second image in the latency buffer that is not processed by the condition change and enters the latency buffer later than the first image, and to compare the left period with the first average consuming period and determine whether to drop the second image in accordance with a comparison result of the left period and the first average consuming period.

The first embodiment of the present invention does not accurately compute the timestamp of each image, and has an aim of rapidly achieving the system load reduction and quickly triggering the image dropping. To further decrease a number of the dropped images, the second embodiment of the present invention can prioritize maintaining the image frame rate and apply a load estimation algorithm to consider the time difference between the timestamp of each image and the timestamp of the final image accommodation interval of the latency buffer, and the average consuming period of the condition change process, for balancing the system load and achieving the preferred system load reduction performance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
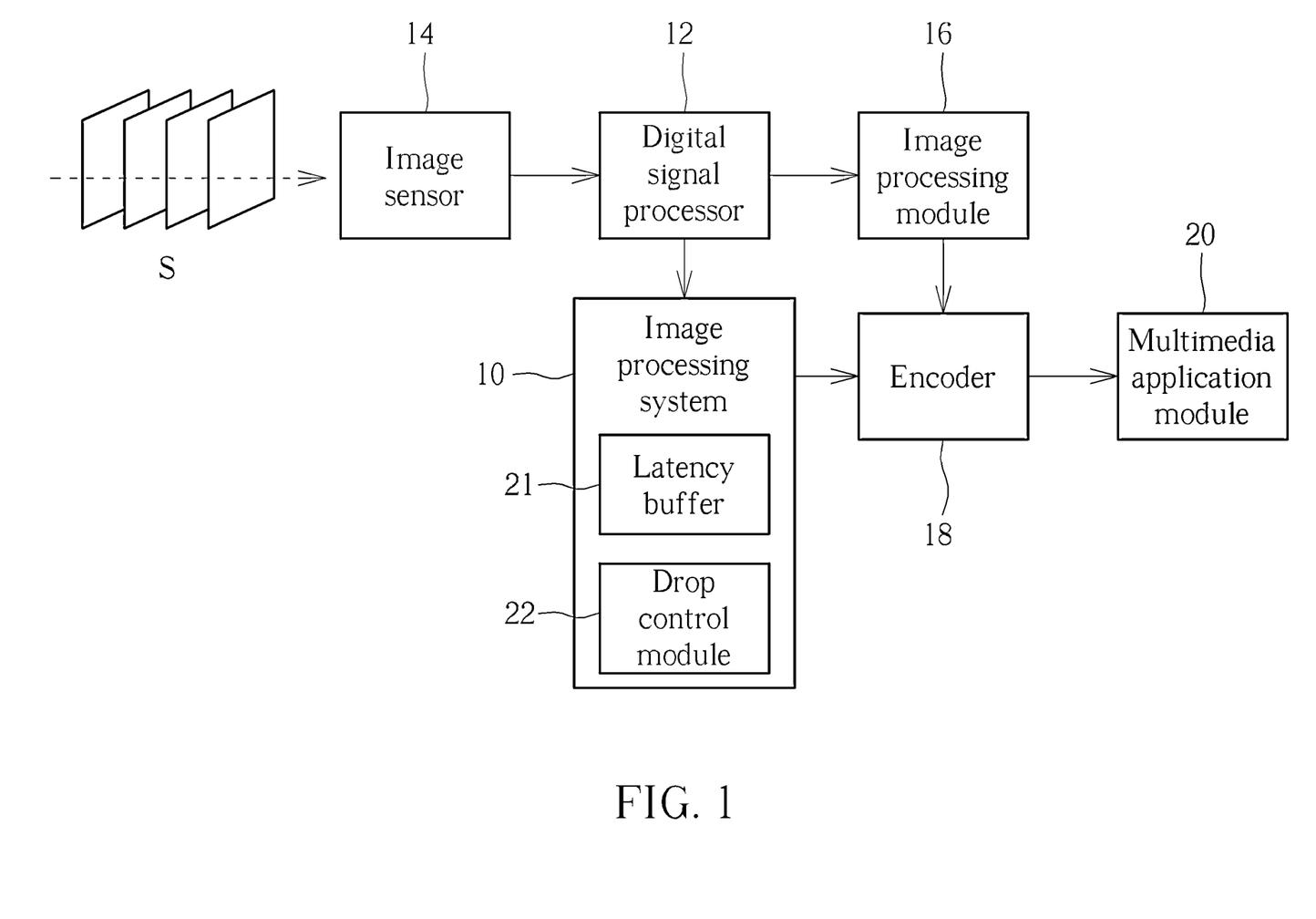
FIG. 1 is a functional diagram of an image processing system according to an embodiment of the present invention.

Please refer to FIG. 1. FIG. 1 is a functional diagram of an image processing system 10 according to an embodiment of the present invention. The image processing system 10 can utilize a digital signal processor 12 to acquire an image stream S from an image sensor 14. The image stream S can contain continuous images, and raw data of the image can be transmitted to the image processing system 10 for executing an adaptive frame dropping control method of the present invention, and further may be transmitted to an image processing module 16 for executing a related condition change process. The condition change process can be a specific image analyzing algorithm, such as adding mosaics or watermarks on the images, or dynamically adjusting its compression parameters, which depends on an actual demand. An encoder 18 can receive data from the image processing system 10 and the image processing module 16.

If difference between a speed at which the image processing module 16 executes the condition change process and an encoding frame rate of the encoder 18 is too large, the image processing system 10 can decide whether to drop some image in accordance with an execution result of the adaptive frame dropping control method; relevant content will be illustrated as following. The encoder 18 can transmit the images to a multimedia application module 20 for further application. It should be mentioned that the image processing system 10 can perform operation of dropping the images in the encoder 18, or perform the operation of dropping the images in the multimedia application module 20, which can be adjusted in accordance with codec requirement of the images. The image processing system 10 is not limited to match with the foresaid various application modules, and its associated operation is not limited to the foresaid embodiments, and depends on a design demand.

A latency buffer 21 of the image processing system 10 can include a plurality of image accommodation intervals A used to accommodate the plural images of the image stream S. A drop control module 22 of the image processing system 10 can execute the adaptive frame dropping control method of the present invention on the image stream S. The adaptive frame dropping control method can perform loading surveillance and judgment or marking of a dropped image within related time intervals of the image accommodation intervals A, and decide whether to drop some images from the image stream S, so as to prevent abnormal images that is not accurately executed by the condition change process from being applied to the multimedia application module 20 for further application. Therefore, the adaptive frame dropping control method and the image processing system 10 of the present invention can have functions of load shedding and dropping of the abnormal images.

When a number of accommodated images N (which means a number of the image accommodation intervals A) of the latency buffer 21 is larger, the image processing system 10 can tolerate more abnormal images; the more images that can be adaptively adjusted and judged, the fewer images need to be dropped, which is beneficial to increasing a number of effectively encoded images. That is to say, the latency buffer 21 can be a buffer mediator between the image sensor 14 and the encoder 18, and used to detect a processing period of each image that is executed by the condition change process, and further to decide whether the detected image belongs to the dropped image, for reducing coding burden on the backend (such as the encoder 18 or the multimedia application module 20) and avoiding generation of the abnormal images.

Figure 2:
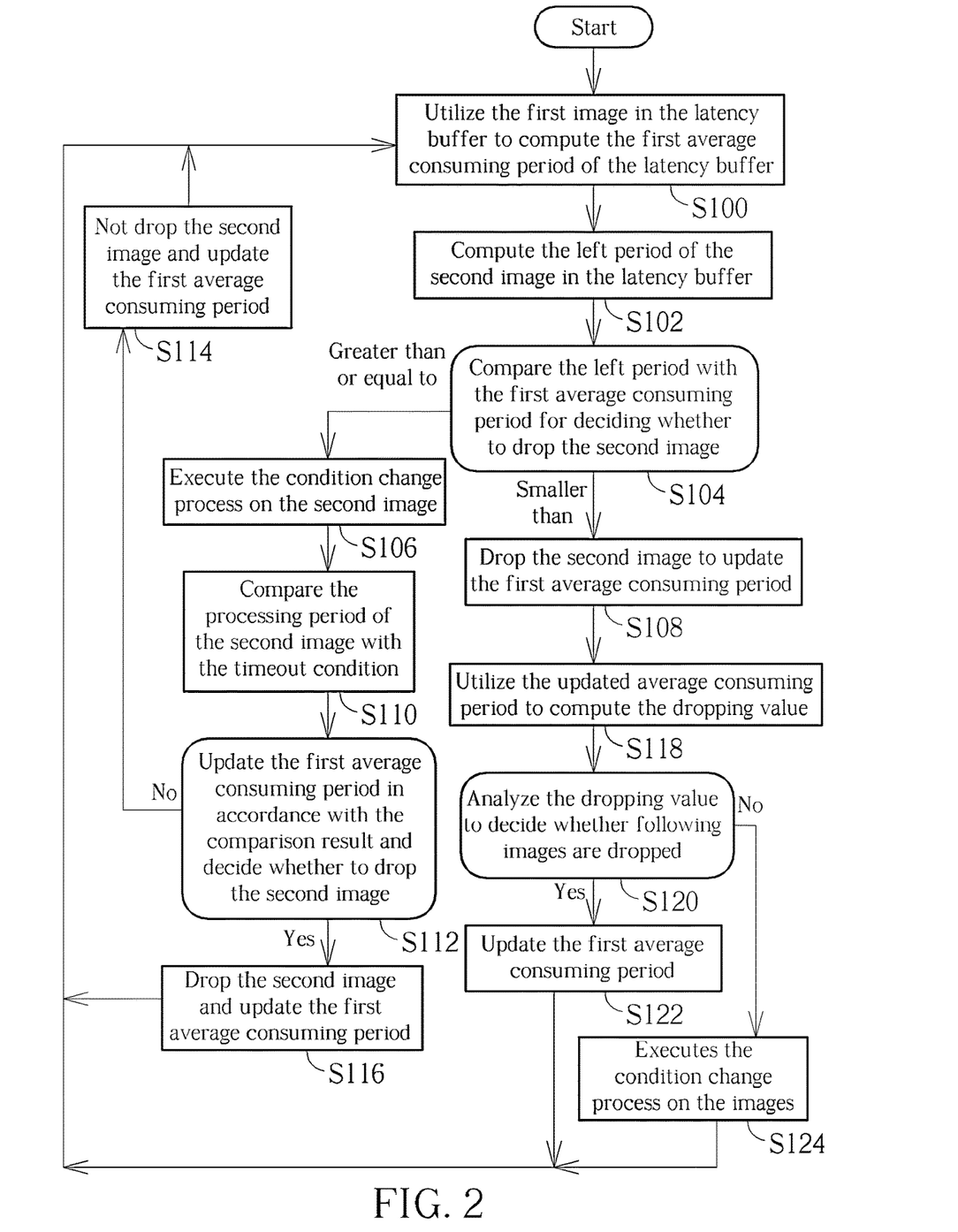
FIG. 2 is a flow chart of the adaptive frame dropping control method according to the embodiment of the present invention.
Figure 3:
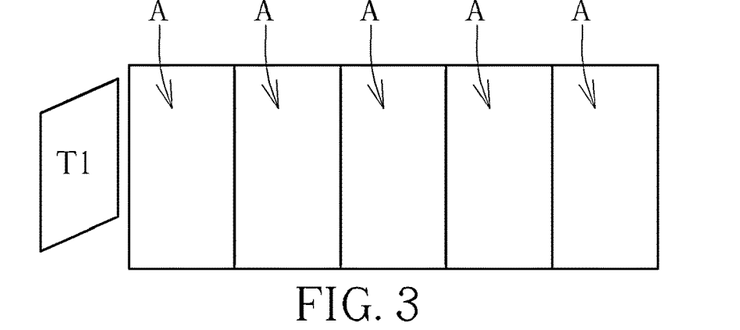
FIG. 3 to FIG. 9 are diagrams of a latency buffer in different operation modes according to the embodiment of the present invention.
Figure 4:
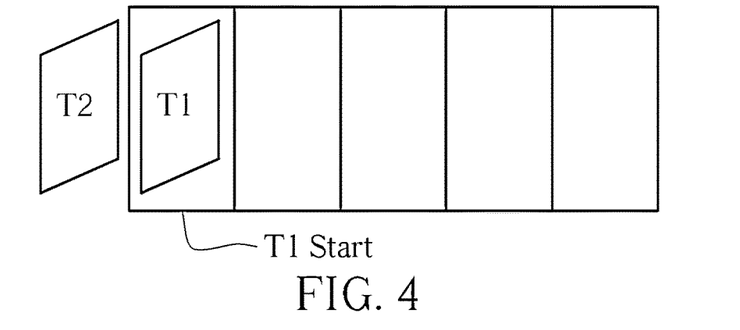
Figure 5:
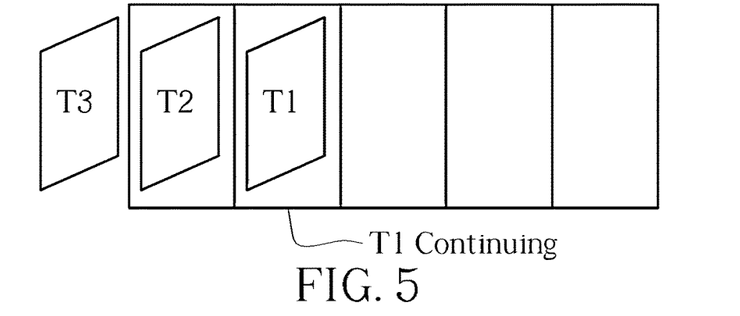
Figure 6:
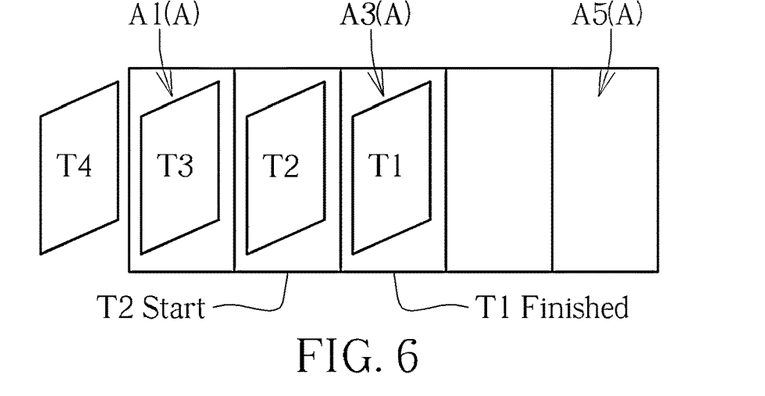

Please refer to FIG. 2 to FIG. 9. FIG. 2 is a flow chart of the adaptive frame dropping control method according to the embodiment of the present invention. FIG. 3 to FIG. 9 are diagrams of the latency buffer 21 in different operation modes according to the embodiment of the present invention. About the adaptive frame dropping control method, step S100 can be first executed that the drop control module 22 acquires a first image T1 from the latency buffer 21 that is not processed by condition change, and execute the condition change process on the first image T1, and utilize the first image T1 to compute a first average consuming period AVG1 of the latency buffer 21, as shown in FIG. 3 to FIG. 6. Then, step S102 can be executed to acquire a second image T2 from the latency buffer 21 that is not processed by the condition change and enters the latency buffer 21 later than the first image T1, and to compute a left period LT of the second image T2 when the condition change process executed on the first image T1 is completed, as shown in FIG. 5 and FIG. 6.

In the embodiment, the first image T1 and the second image T2 can be from the same image stream S, and a timestamp of the second image T2 can be later than a timestamp of the first image T1, and the second image T2 and the first image T1 can be adjacent relationship between the front and rear images; practical relationship of the first image T1 and the second image T2 is not limited to the foresaid embodiment. For example, the second image T2 and the first image T1 may be from the same image stream S, but there are multiple other images set between the first image T1 and the second image T2; or, the second image T2 and the first image T1 may be respectively from different image streams S. Any set of two images that the time when the second image T2 enters the latency buffer 21 is later than the time when the first image T1 enters the latency buffer 21 can conform to a design scope of the present invention.

In step S100, the first average consuming period AVG1 can be interpreted as a period it takes for the first image T1 to execute the condition change process. The present invention can provide two embodiments to acquire the first average consuming period AVG1. The first average consuming period AVG1 in the first embodiment can be a fixed value, which means the first average consuming period AVG1 is not varied as the latency buffer 21 successively accommodates different images of the image stream S. The first embodiment can utilize the number of accommodated images N of the latency buffer 21 and a frame interval FI of the image sensor 14 to compute the first average consuming period AVG1; the number of accommodated images N can be interpreted as a number of the image accommodation intervals A, and the frame interval FI can be converted from a frame rate (or FPS) of the image sensor 14. For example, if the number of accommodated images N is 5, and the frame rate of the image sensor 14 is 30 FPS, the converted frame interval FI can be 33 milliseconds; as the following formula 1.

$$AVG1 = (N-1)*FI \qquad \text{Formula 1}$$

The second embodiment can dynamically adjust the first average consuming period AVG1, so the first average consuming period AVG1 can be varied immediately in accordance with periods it take for different images in the latency buffer 21 to execute the condition change process. The second embodiment can optionally compute a condition change time-consuming average value of a plurality of condition-changed images relevant to the current image (such as the first image T1, but the actual application is not limited to the embodiment) for setting as the first average consuming period AVG1. Generally, the present invention can set the condition-changed images with the timestamp closest to the timestamp of the current image (such as the first image T1) to be relevant, and therefore the foresaid images can conform to immediate assessment representativeness of system load; the condition change time-consuming average value can be computed by an actual number of the condition-changed images and consuming time of each condition-changed image executed by the condition change process.

For example, if there are multiple condition-changed images before the first image T1, and the consuming time of each condition-changed image executed by the condition change process respectively are 40 milliseconds, 20 milliseconds, 14 milliseconds, 36 milliseconds and 90 milliseconds, the second embodiment can compute that the condition change time-consuming average value (which means the first average consuming period AVG1) is 40 milliseconds in accordance with the foresaid five consuming time. Further, if the first image T1 is a primary image in the latency buffer 21 when the present invention executes the adaptive frame dropping control method, the consuming time of the primary image executed by the condition change process can be assumed to be 99 milliseconds by referring to FIG. 6, and the condition change time-consuming average value (which means the first average consuming period AVG1) computed by the second embodiment can be 99 milliseconds.

In addition, in step S100, the adaptive frame dropping control method of the present invention can further compute a time difference between a timestamp of the second image T2 and a timestamp of the final image accommodation interval A of the latency buffer 21 to set as the left period LT. For example, the latency buffer 21 may have five image accommodation interval A (which means the number of accommodated images N equals 5), and a period of each image accommodation interval A can be 33 milliseconds by referring to the frame rate of the image sensor 14 (such as 30 FPS). In FIG. 6, the leftmost image accommodation interval A can be defined as an initial image accommodation interval A1, and the rightmost image accommodation interval A can be defined as a final image accommodation interval A5; assuming that the first image T1 requires three image accommodation intervals A to complete the condition change process, such as from the leftmost image accommodation interval A1 to a middle image accommodation interval A3 in the latency buffer 21, and the left period LT of the second image T2 can correspond to the three image accommodation intervals A on the right and equal 99 milliseconds.

After step S100 and step S102, step S104 can be executed to compare the left period LT of the second image T2 with the first average consuming period AVG1 of the latency buffer 21, and decide whether to drop the second image T2 in accordance with a foresaid comparison result. When the left period LT is greater than or equal to the first average consuming period AVG1, step S106 can be executed to not drop the second image T2 and further utilize the drop control module 22 to execute the condition change process on the second image T2. When the left period LT is smaller than the first average consuming period AVG1, step S108 can be executed to utilize the drop control module 22 to drop the second image T2 and accordingly update the first average consuming period AVG1. The present invention first takes the second embodiment (such as dynamically adjusting the first average consuming period AVG1) as an example, which assumes the first image T1 is the primary image, and the period of the primary image executed by the condition change process can be 99 milliseconds (which means the time of the three image accommodation interval A that the first image T1 is moved from FIG. 4 to FIG. 6), so the related first average consuming period AVG1 can be 99 milliseconds, and the left period LT of the second image T2 at this time can be 99 milliseconds (which corresponds to the three image accommodation intervals A on the right in FIG. 6); therefore, the result conforms to a situation that the left period LT (99 milliseconds) is greater than or equal to the first average consuming period AVG1 (99 milliseconds) in step S106, and the condition change process can be executed on the second image T2.

After step S106, step S110 and step S112 can be executed to utilize the drop control module 22 to compare the processing period TS of the second image T2 executed by the condition change process with a timeout condition, and update the first average consuming period AVG1 in accordance with a comparison result of the processing period TS and the timeout condition, for deciding whether to drop the second image T2. When the processing period TS does not exceed the timeout condition, step S114 can be executed that the drop control module 22 decides to not drop the second image T2 and further utilize the second image T2 and the first image T1 to compute a second average consuming period AVG2 of the latency buffer 21, for replacing the first average consuming period AVG1 and completing the update. When the processing period TS exceeds the timeout condition, step S116 can be executed that the drop control module 22 decides to drop the second image T2 and further use a preset weight value "a" to adjust a ratio of the processing period TS of the second image T2 executed by the condition change process to the first average consuming period AVG1, so as to compute the second average consuming period AVG2 of the latency buffer 21, for replacing the first average consuming period AVG1 and completing the update.

In step S110, this embodiment can set a current average consuming period (such as the first average consuming period AVG1) as the timeout condition; however, practical application of the timeout condition is not limited to the embodiment. For example, the timeout condition can be manually set according to user experience, or can be computed according to other factors. Besides, the processing period TS of the second image T2 executed by the condition change process can be set in accordance with an actual condition, and a detailed description is omitted herein for simplicity. In step S114, the condition change process can be completed on the second image T2 on time, and therefore the second image T2 can be reserved. The second image T2 can be regarded as the foresaid condition-changed images, and the processing period TS of the second image T2 can be used to compute the condition change time-consuming average value of the second embodiment, so as to generate the second average consuming period AVG2 for replacing the first average consuming period AVG1 in step S100.

Figure 7:
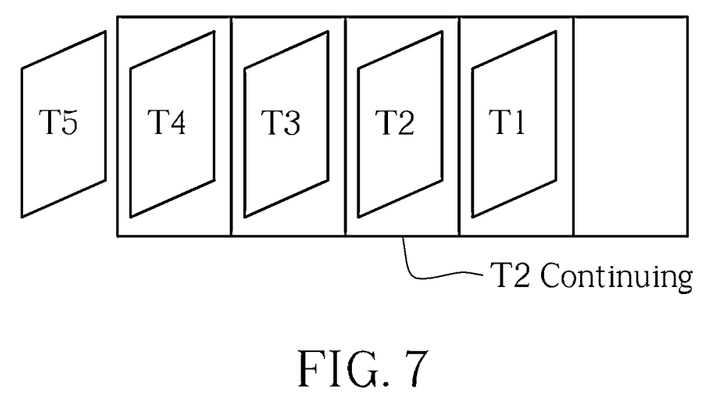
Figure 8:
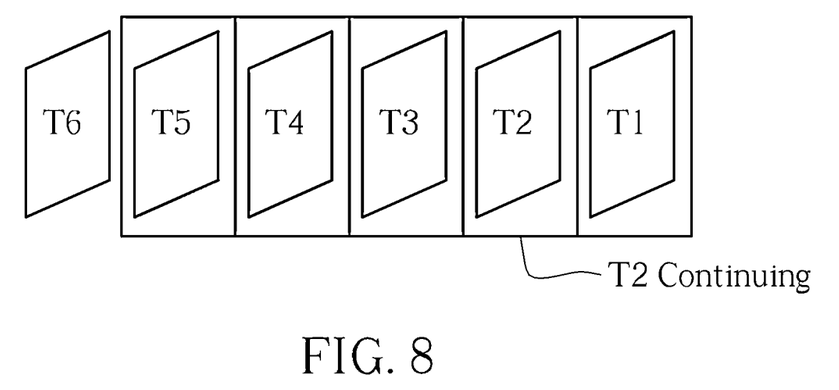
Figure 9:
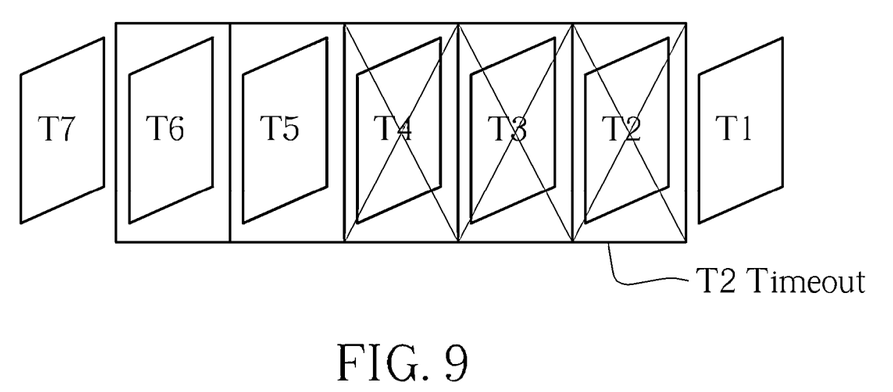

In step S116, the timeout condition can be assumed as 99 milliseconds; if the second image T2 cannot complete the condition change process within the timeout condition (which means its consuming period exceeds 99 milliseconds from FIG. 7 to FIG. 9), the second image T2 may affect following images in the latency buffer 21, so that the drop control module 22 can decide to drop the second image T2, such as a crossed symbol shown in FIG. 9; in the meantime, the present invention can use a weighted ratio to strengthen time estimation error cost of the second image T2. The present invention can use a manual setting method or an automatic computation method to generate the preset weight value "a", for modulating the ratio of the processing period TS to the first average consuming period AVG1, and the second average consuming period AVG2 in formula 2 can be acquired to replace the first average consuming period AVG1 in step S100. For example, if the preset weight value "a" is assumed as 0.5, the processing period TS of the second image T2 is 99 milliseconds, and the first average consuming period AVG1 is 99 milliseconds, so the second average consuming period AVG2 can be computed as 99 milliseconds via formula 2.

$$AVG2 = (1-a)*AVG1 + a*TS \quad \text{Formula 2}$$

When decision of dropping the second image T2 is completed in step S116, the drop control module 22 can analyze next image in the latency buffer 21, which means returning to step S100 and step S102 and step S104 for acquiring a third image T3 in the latency buffer 21 that is not processed by condition change and enters the latency buffer 21 later than the second image T2, computing the left period LT of the third image T3 to compare with the second average consuming period AVG2 of the latency buffer 21. As shown in FIG. 9, the left period LT of the third image T3 can only correspond to one image accommodation interval A, which is equal to 33 milliseconds; the left period LT of the third image T3 can be smaller than the second average consuming period AVG2 (such as 99 milliseconds computed as above), and be similar to the situation in step S108. In the meantime, the drop control module 22 does not execute the condition change process, and decides to drop the third image T3; the processing period TS of executing the condition change process on the third image T3 is not acquirable. In this situation, the adaptive frame dropping control method of the present invention can update the current average consuming period of the latency buffer 21 (which can be the first average consuming period AVG1 or the second average consuming period AVG2 to correspond to the first image T1, the second image T2 and/or the third image T3) based on the frame interval FI (such as 33 milliseconds).

For example, the third image T3 can be marked as the dropped image, such as the crossed symbol shown in FIG. 9, and the processing period TS of the third image T3 can be set as 33 milliseconds; the current average consuming period of the latency buffer 21 can be 99 milliseconds (which corresponds to the first image T1 and the second image T2 and can be 99 milliseconds computed as above), and the latency buffer 21 can compute an average of two values of 99 milliseconds and one value of 33 milliseconds to get 77 milliseconds for setting as the updated average consuming period.

Then, step S118 and step S120 can be executed that the drop control module 22 can utilize the updated average consuming period (which may be the first average consuming period AVG1 or the second average consuming period AVG2, or the 77 milliseconds computed as above in accordance with the process) and the frame interval FI to compute a loading value LC via formula 3; and utilize the number of accommodated images N, the left period LT of the third image T3, and the frame interval FI to compute an extreme value WC via formula 4; and analyze the loading value LC and the extreme value WC to acquire a dropping value M, as formula 5, for deciding whether to drop the next image or following images, such as a fourth image T4 shown in FIG. 9. When the dropping value M is greater than or equal to 1, a unconditionally discarded value of the dropping value M is defined as a number of dropped images.

$$LC = AVG1(or\,AVG2)/FI \quad \text{Formula 3}$$

$$WC = (N-1) - LT/FI \quad \text{Formula 4}$$

$$M = \text{Min}(LC, WC) - 1 \quad \text{Formula 5}$$

The updated average consuming period in step S118 (which may be the first average consuming period AVG1 or the second average consuming period AVG2, or other updated average consuming period) can be 77 milliseconds, and the frame interval FI can be 33 milliseconds, so that the related loading value LC can be computed as 2.33 via formula 3; the number of accommodated images N can be 5, and the left period LT of the third image T3 can be 33 milliseconds shown in FIG. 9, so the related extreme value WC can be computed as 3 via formula 4. Therefore, the loading value LC and the extreme value WC as mentioned above can be applied for formula 5 to acquire the dropping value M setting as 1.33, and the drop control module 22 can further compute that the unconditionally discarded value of the dropping value M is equal to 1 and indicate that one image is dropped after the third image T3, which means the fourth image T4 in the latency buffer 21 that is not processed by the condition change and enters the latency buffer 21 later than the third image T3 can be the dropped image; accordingly, other image in the latency buffer 21 that is not processed by the condition change and enters the latency buffer 21 later than the fourth image T4 can also be analyzed via foresaid steps.

After step S120, when the adaptive frame dropping control method decides to drop the fourth image T4, step S122 can be executed to update the current average consuming period (which can be the first average consuming period AVG1 or the second average consuming period AVG2, or other updated average consuming period) to a situation corresponding to the first image T1, the second image T2, the third image T3 and the fourth image T4 by the frame interval FI; for example, the current average consuming period of the first image T1, the second image T2 and the third image T3 can be computed as 77 milliseconds, and the frame interval FI can be regarded as the processing period TS (which means 33 milliseconds) of the fourth image T4, so the updated average consuming period of the latency buffer 21 can be computed as 66 milliseconds by an average of three values of 77 milliseconds and one value of 33 milliseconds. When the adaptive frame dropping control method decides to not drop the fourth image T4, step S124 can be executed that the drop control module 22 executes the condition change process on the fourth image T4, and can return to initial steps of the adaptive frame dropping control method for computation and analysis of other images (such as a fifth image T5 or a sixth image T6).

Figure 10:
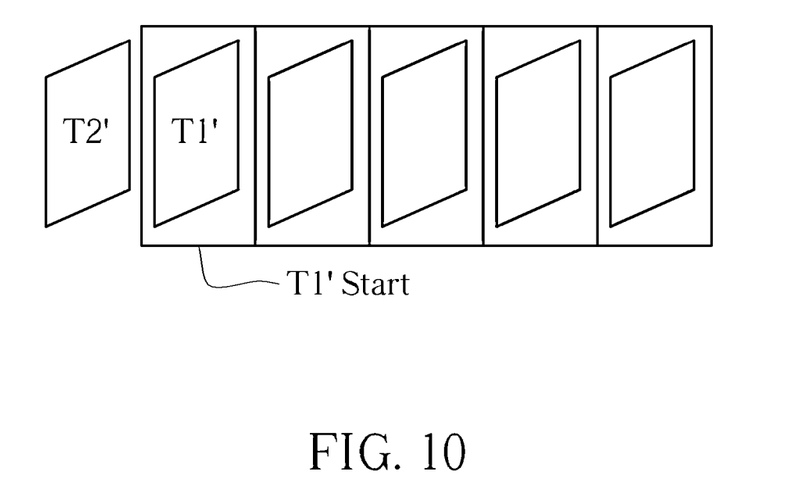
FIG. 10 and FIG. 11 are diagrams of the latency buffer in different operation modes according to another embodiment of the present invention.
Figure 11:
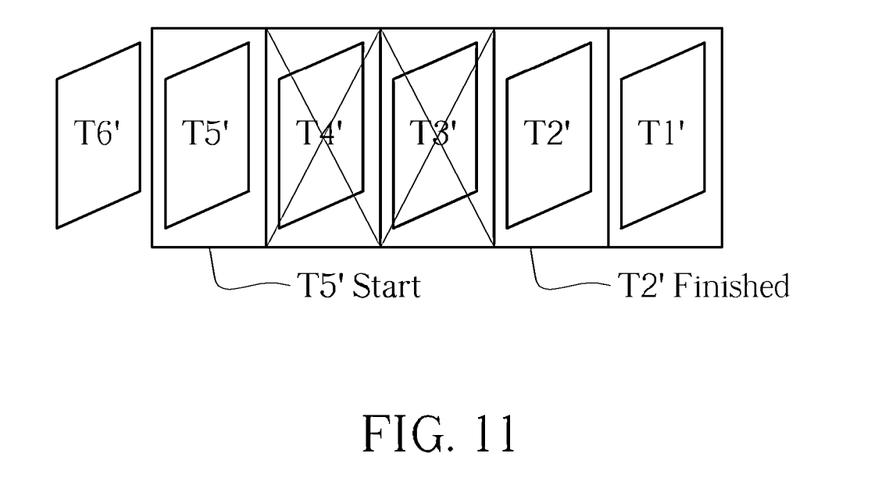

Besides, the present invention can take the first embodiment (which means the first average consuming period AVG1 is the fixed value) as an example. Please refer to FIG. 2 and FIG. 10 to FIG. 11. FIG. 10 and FIG. 11 are diagrams of the latency buffer 21 in different operation modes according to another embodiment of the present invention. This embodiment can compute the first average consuming period AVG1 via formula 1; for example, the number of accommodated images N can be 5, the frame interval FI can be 33 milliseconds, and the first average consuming period AVG1 can be computed as 132 milliseconds (which means four times 33 milliseconds). When the drop control module 22 acquires the first image T1' from the latency buffer 21 that is not processed by the condition change, the left period LT of the first image T1' can be 132 milliseconds, such as four image accommodation intervals A shown in FIG. 10. The present invention can determine that the left period LT of the first image T1' is greater than or equal to the first average consuming period AVG1 by executing step S104 of the adaptive frame dropping control method, and decide to not drop the first image T1' but execute the condition change process on the first image T1' by executing step S106 of the adaptive frame dropping control method.

If it is assumed that the first image T1' can complete the condition change process within one frame interval FI, and the second image T2' which enters the latency buffer 21 later than the first image T1' consumes three frame intervals FI to complete the condition change process, as shown in FIG. 11, the drop control module 22 can acquire the third image T3' from the latency buffer 21 that is not processed by the condition change and enters the latency buffer 21 later than the second image T2', and can further compute that the left period LT of the third image T3' only corresponds to two frame intervals FI. The adaptive frame dropping control method of the present invention can determine the left period LT of the third image T3' being smaller than the first average consuming period AVG1 by executing step S104, and decide to drop the third image T3' by executing step S108.

Then, the adaptive frame dropping control method of the present invention can compute the loading value LC of the third image T3' via formula 3 by executing step S118, and the loading value LC can be a ratio of the first average consuming period AVG1 (such as the fixed value of 132 milliseconds) and the frame interval FI (such as 33 milliseconds) and equal to 4; the adaptive frame dropping control method can further compute the extreme value WC of the third image T3' via formula 4, which is equal to 2 by computation of the number of accommodated images N, the left period LT of the third image T3' (such as 66 milliseconds) and the frame interval FI (such as 33 milliseconds); final, the adaptive frame dropping control method can further compute the dropping value M equal to 1 via formula 5, so that one image (meaning the fourth image T4') can be dropped after the third image T3'. Therefore, the drop control module 22 can continuously acquire and execute the condition change process on the fifth image T5' and/or the sixth image T6' from the latency buffer 21 that enter the latency buffer 21 later than the fourth image T4'.

That is, the first average consuming period AVG1 set as the fixed value and provided by the first embodiment, and the dynamically adjustable first average consuming period AVG1 provided by the second embodiment can be adaptively applied for the adaptive frame dropping control method of the present invention, and the user can choose to perform load reduction priority operation of the first embodiment or delayed load reduction operation of the second embodiment in accordance with the actual demand.

Combined with the adaptive frame dropping control method as mentioned above, the encoder 18 of one possible embodiment of the present invention can acquire an oldest image from the latency buffer 21 at any time, and decide whether the oldest image is marked as the dropped image by the drop control module 22. If there is a dropped mark on the oldest image, the encoder 18 can ignore the foresaid oldest image and acquire another oldest image from the latency buffer 21; if there is no dropped mark on the oldest image, the encoder 18 can encode the foresaid oldest image and then decide whether other images need to be encoded. If the other images need to be encoded, the encoder 18 can acquire one oldest image from the latency buffer 21 again, and then continues the foresaid process; if the other images do not need to be encoded, the encoder 18 can optionally clear the latency buffer 21 to terminate the process.

In other possible embodiment, when the encoder 18 acquires the oldest image from the latency buffer 21, the adaptive frame dropping control method can transmit related images and data towards the multimedia application module 20, and the multimedia application module 20 can determine whether the drop control module 22 decides or marks the oldest image as the dropped image; then, the adaptive frame dropping control method can perform following operation as one of the foresaid embodiments. Therefore, the present invention can decide which of the foresaid embodiments is suitable in accordance with the encoding and decoding format or other parameters of the image, such as encoding and decoding characteristics of H264/H265 or MJEPG.

In conclusion, the first embodiment of the present invention does not accurately compute the timestamp of each image, and has an aim of rapidly achieving the system load reduction and quickly triggering the image dropping. To further decrease a number of the dropped image, the second embodiment of the present invention can prioritize maintaining the image frame rate and apply a load estimation algorithm to consider the time difference between the timestamp of each image and the timestamp of the final image accommodation interval of the latency buffer, and the average consuming period of the condition change process, for balancing the system load and achieving the preferred system load reduction performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adaptive frame dropping control method applied to an image processing system, the adaptive frame dropping control method comprising:
   a drop control module of the image processing system utilizing a first image in a latency buffer that is not processed by condition change to compute a first average consuming period of the latency buffer;
   the drop control module computing a left period of a second image in the latency buffer that is not processed by the condition change and enters the latency buffer later than the first image; and
   the drop control module comparing the left period with the first average consuming period and determining whether to drop the second image in accordance with a comparison result of the left period and the first average consuming period.

2. The adaptive frame dropping control method of claim 1, further comprising:
   the drop control module computing the first average consuming period by a computation value of a number of accommodated images of the latency buffer and a frame interval of an image sensor of the image processing system, or the drop control module computing a condition change time-consuming average value of a plurality of condition-changed images relevant to the first image for setting as the first average consuming period; and
   the drop control module computing a time difference between a timestamp of the second image and a timestamp of a final image accommodation interval for setting as the left period.

3. The adaptive frame dropping control method of claim 1, further comprising:
   the drop control module executing a condition change process on the second image when the left period is greater than or equal to the first average consuming period.

4. The adaptive frame dropping control method of claim 3, further comprising:
   the drop control module comparing a processing period of the condition change process with a timeout condition; and
   the drop control module utilizing a comparison result of the processing period and the timeout condition to accordingly update the first average consuming period, and further decide whether to drop the second image.

5. The adaptive frame dropping control method of claim 4, further comprising:
   the drop control module utilizing the second image and the first image to compute a second average consuming period of the latency buffer for replacing the first average consuming period when the processing period does not exceed the timeout condition.

6. The adaptive frame dropping control method of claim 4, further comprising:
the drop control module utilizing a preset weight value to adjust a ratio of the processing period to the first average consuming period for computing a second average consuming period of the latency buffer and further replacing the first average consuming period when the processing period exceeds the timeout condition.

7. The adaptive frame dropping control method of claim 1, further comprising:
the drop control module dropping the second image and accordingly updating the first average consuming period when the left period is smaller than the first average consuming period; and
the drop control module utilizing a frame interval of an image sensor of the image processing system to update the first average consuming period for corresponding to the first image and the second image.

8. The adaptive frame dropping control method of claim 1, further comprising:
the drop control module utilizing the first average consuming period and a frame interval of an image sensor of the image processing system to compute a loading value;
the drop control module utilizing a number of accommodated images of the latency buffer, the left period and the frame interval to compute an extreme value; and
the drop control module analyzing the loading value and the extreme value to acquire a dropping value, for deciding whether to drop a next image in the latency buffer that is not processed by the condition change and enters the latency buffer later than the second image.

9. The adaptive frame dropping control method of claim 8, further comprising:
the drop control module utilizing the frame interval to update the first average consuming period corresponding to the first image, the second image and the next image when dropping the next image.

10. The adaptive frame dropping control method of claim 8, further comprising:
the drop control module executing a condition change process on the next image when not dropping the next image.

11. An image processing system, comprising:
a latency buffer having a plurality of image accommodation intervals adapted to accommodate several images of an image stream; and
a drop control module electrically connected with the latency buffer, and adapted to utilize a first image in the latency buffer that is not processed by condition change to compute a first average consuming period of the latency buffer, to compute a left period of a second image in the latency buffer that is not processed by the condition change and enters the latency buffer later than the first image, and to compare the left period with the first average consuming period and determine whether to drop the second image in accordance with a comparison result of the left period and the first average consuming period.

12. The image processing system of claim 11, wherein the drop control module is adapted to further compute the first average consuming period by a computation value of a number of accommodated images of the latency buffer and a frame interval of an image sensor of the image processing system, or further compute a condition change time-consuming average value of a plurality of condition-changed images relevant to the first image for setting as the first average consuming period, and further compute a time difference between a timestamp of the second image and a timestamp of a final image accommodation interval for setting as the left period.

13. The image processing system of claim 11 wherein the drop control module is adapted to further execute a condition change process on the second image when the left period is greater than or equal to the first average consuming period.

14. The image processing system of claim 13, wherein the drop control module is adapted to further compare a processing period of the condition change process with a timeout condition, and utilize a comparison result of the processing period and the timeout condition to accordingly update the first average consuming period, and further decide whether to drop the second image.

15. The image processing system of claim 14, wherein the drop control module is adapted to further utilize the second image and the first image to compute a second average consuming period of the latency buffer for replacing the first average consuming period when the processing period does not exceed the timeout condition.

16. The image processing system of claim 14, wherein the drop control module is adapted to further utilize a preset weight value to adjust a ratio of the processing period to the first average consuming period for computing a second average consuming period of the latency buffer and further replacing the first average consuming period when the processing period exceeds the timeout condition.

17. The image processing system of claim 11, wherein the drop control module is adapted to further drop the second image and accordingly updating the first average consuming period when the left period is smaller than the first average consuming period, and further utilize a frame interval of an image sensor of the image processing system to update the first average consuming period for corresponding to the first image and the second image.

18. The image processing system of claim 11, wherein the drop control module is adapted to further utilize the first average consuming period and a frame interval of an image sensor of the image processing system to compute a loading value, to utilize a number of accommodated images of the latency buffer, the left period and the frame interval to compute an extreme value, and to analyze the loading value and the extreme value to acquire a dropping value, for deciding whether to drop a next image in the latency buffer that is not processed by the condition change and enters the latency buffer later than the second image.

19. The image processing system of claim 18, wherein the drop control module is adapted to further utilize the frame interval to update the first average consuming period corresponding to the first image, the second image and the next image when dropping the next image.

20. The image processing system of claim 18, wherein the drop control module is adapted to further execute a condition change process on the next image when not dropping the next image.

* * * * *